April 21, 1959
F. H. TOWLER ET AL
2,882,931
IMPULSE ACTUATED SERVO-CONTROL VALVE
Filed April 1, 1953
2 Sheets-Sheet 1
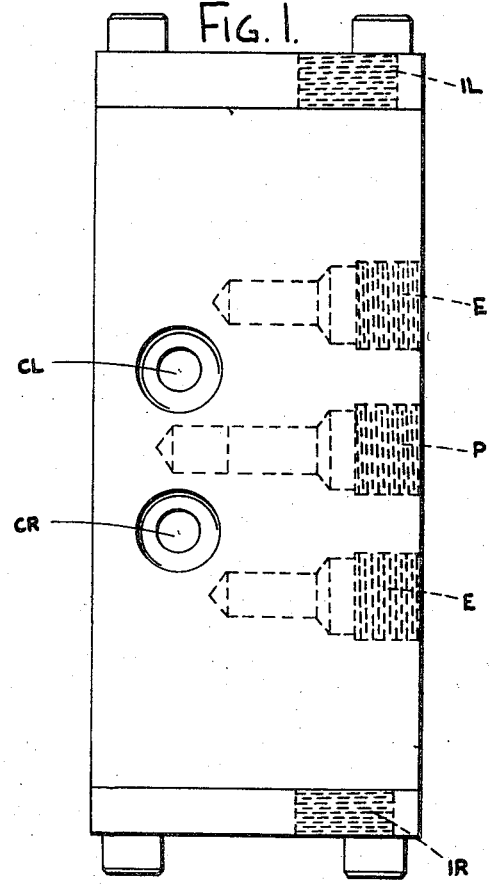
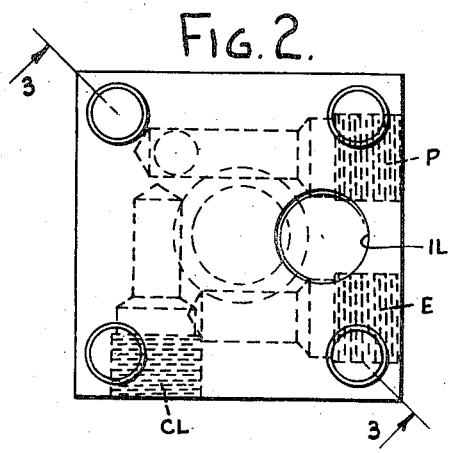
INVENTORS
FRANK HATHORN TOWLER
JOHN MAURICE TOWLER
BY:
ATTORNEYS

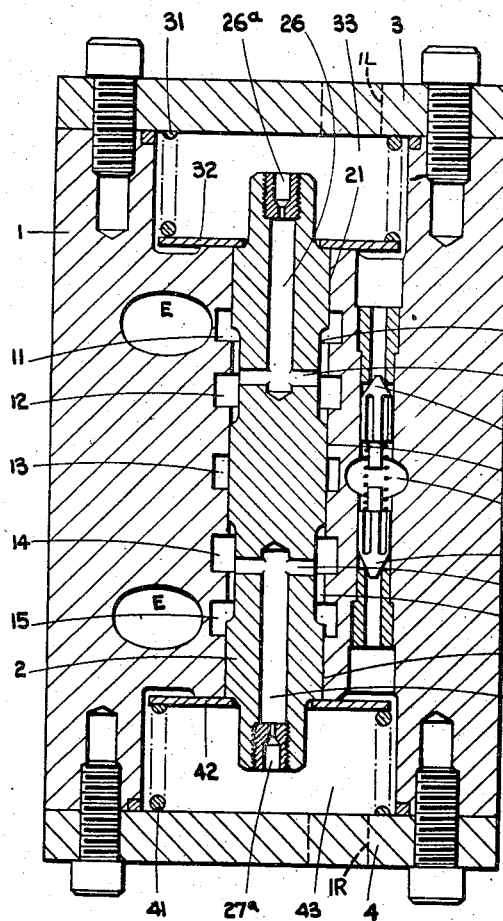
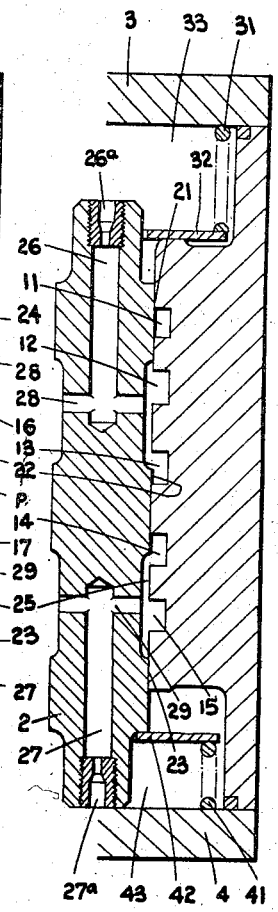

United States Patent Office 2,882,931
Patented Apr. 21, 1959

2,882,931

IMPULSE ACTUATED SERVO-CONTROL VALVE

Frank Hathorn Towler, Rodley, and John Maurice Towler, Dob Park, near Otley, England, assignors to Electraulic Presses Limited, Rodley, England, a limited-liability company.

Application April 1, 1953, Serial No. 346,243

Claims priority, application Great Britain
April 5, 1952

2 Claims. (Cl. 137—622)

This invention relates to hydraulic control valves, preferably of the packingless piston type in which the valve spindle is a sliding lap fit in the valve body.

An object of this invention is to provide a directional servo-control valve of improved design which may be used to direct servo-pressure to actuate a servo-actuated primary control valve of a hydraulic press or machine.

A further object of this invention is to provide a servo-control valve which is so constructed that it will be moved to the neutral or inoperative position automatically in the event of a failure or interruption in the supply of servo-pressure. Yet a further object of this invention is to provide what might be termed a servo-actuated servo-control valve, that is to say a servo-control valve which is so designed that when actuated by servo or pilot pressure it will direct the self same servo-pressure to actuate a servo-actuated primary control valve, which latter for instance may be constructed as described in our co-pending United States application Serial No. 325,288 of December 11, 1952.

It will be understood that the term "servo-control valves" is intended to describe a valve which controls the movement of pilot pressure liquid; and the term "primary control valve" is intended to describe a valve which controls the movement of primary pressure liquid. Thus, broadly it may be said that pilot pressure is used to actuate the valve mechanism and primary pressure is used to actuate the pistons and cylinders of a hydraulic press or machine.

Broadly the present invention consists of a control valve for directing the flow of pilot pressure fluid which operates automatically following the application thereto of a momentary impulse by pressure fluid.

A control valve according to an embodiment of the invention has a body and a valve member in the form of a piston or spindle which is adapted to be reciprocated within a bore in said body for directing the flow of pilot pressure liquid to and from a primary control valve and to be automatically centralized by spring pressure in a neutral position, wherein initial movement of the valve member is imparted by application of the momentary impulse and further movement is caused by pilot pressure liquid entering through a port that is opened by the valve member on its initial movement, and so that the invention may be clearly understood and carried into effect such an embodiment will now be described, by way of example, by aid of the accompanying drawings in which:

Fig. 1 shows a side elevation of the valve,
Fig. 2 shows an end elevation,
Fig. 3 shows a longitudinal section of the valve taken through the line 3—3 Fig. 2 and
Fig. 4 shows a fragmentary longitudinal section of the valve with the valve spindle moved to the extreme right.

The valve according to this embodiment and as illustrated in the drawings may be described as an impulse-actuated servo-control valve. It comprises a valve body 1, having a through bore which is closed at each end by cover plates 3 and 4, and a valve spindle 2 which has a sliding lap fit in the said through bore of the valve body. The bore in the valve body has five annular chambers 11, 12, 13, 14, and 15 spaced apart along its length. The chamber 13 is in permanent communication with the source of servo-pressure which enters the valve at connection P. Chambers 12 and 14 are connected to cylinder connections CL and CR respectively, the said cylinder connections being connected to either end of a servo-actuated primary control valve, such for instance as that described in our co-pending United States application, Serial No. 325,288 of December 11, 1952. Chambers 11 and 15 are connected to exhaust by connections EE. The valve spindle 2 is automatically centred by springs 31 and 41 enclosed in enlarged chambers 33 and 43 of the valve body, the springs abutting against the respective valve covers 3 and 4 and spring pads 32 and 42 mounted upon each end of the valve spindle. As a matter of convenience, the end of the valve spindle projecting into the chamber 33 will be referred to hereinafter as the left end and the end projecting into the chamber 43 will be referred to as the right end. The spring chambers 33 and 43 at each end of the valve communicate respectively through non-return valves 16 and 17 with the pressure connection P. The valve spindle 2 has enlarged portions 21, 22 and 23 which have a sliding lap fit in the valve bore, and they are separated by reduced portions 24 and 25. The control valve spindle in Fig. 3 is shown in the neutral or inoperative position in which the servo-pressure is confined in chamber 13 which is closed by the portion 22 of the valve spindle, and chambers 11 and 12, 14 and 15 are all in communication with exhaust along the reduced portions 24 and 25, so that in this position the cylinder connection CL and CR are both in communication with exhaust, and consequently the servo-actuated primary control valve (not shown) will be in the neutral position also. Impulse connections IL and IR are provided in the valve covers 3 and 4 respectively as shown in Fig. 2. If an impulse of pressure liquid is directed through connection IL to the chamber 33, it will drive the valve spindle to the right, and alternatively, if an impulse of pressure liquid is directed through connection IR to chamber 43, it will drive the valve spindle to the left. The valve spindle has longitudinal bores 26 and 27 in opposite ends which are partially closed at their outer end by chokes or orifices 26a and 27a, and at their inner end they communicate respectively, with transverse passages 28 and 29 in the reduced portions 24 and 25. Thus in the position shown in Fig. 3 both chambers 33 and 43 are in communication with exhaust by the longitudinal bores 26 and 27, and their respective chokes 26a and 27a.

The operation of the servo control valve is as follows, an impulse of pressure liquid is directed through the connection IL to the chamber 33, and commences to drive the valve spindle 2 towards the right, the choke 26a being designed to provide sufficient back pressure to overcome the opposing spring 41 on the other end of the valve spindle. As the valve spindle moves to the right, the portion 21 covers and closes exhaust chamber 11, and then the portion 22 begins to uncover the servo-pressure chamber 13, and at this point the servo-pressure takes charge and drives the valve spindle completely over to the right, servo-pressure via the transverse passage 28, and longitudinal bore 26 and choke 26a to the spring chamber 33 so that the pilot pressure is acting on the area of the left hand end of the valve spindle. The right hand end of the valve spindle throughout this movement has been in communication with exhaust via the orifice 27a, longitudinal bore 27 and transverse passage 29.

The servo control valve is reversed by admitting an impulse of pressure liquid by connection IR to spring chamber 43, and consequently the spindle will first be centralized by the impulse pressure plus the force of the spring 41, and pressure liquid from chamber 33 will be displaced into the servo-pressure line through the non-return valve 16. As the valve spindle moves through the central position, portion 22 closes the servo-pressure chamber 13, and portion 21 uncovers the exhaust chamber 11 so that the spring chamber 33 has access to exhaust through the choke 26a, longitudinal bore 26 and transverse passage 28. Further movement of the spindle towards the left causes portion 23 of the valve spindle to close the exhaust chamber 15, and portion 22 of the valve spindle to uncover the servo-pressure chamber 13, so that servo-pressure is now admitted along the reduced portion 25 to the transverse passage 29, and thence along the longitudinal bore 27 and through the choke 27a to the spring chamber 43 so that servo-pressure is now operating on the right hand end of the valve spindle and moves it completely over to the left. Thus servo pressure is now directed from the chamber 13 to the chamber 14 and thence to the cylinder connection CR to reverse the operation of the servo-actuated primary control valve. On the other hand, if there is a failure of the servo-pressure to connection P, or if it is interrupted, then the servo-control valve spindle will be automatically centralised into neutral by centralising springs 31 or 41, and displacement of the valve spindle will be taken care of by the appropriate non-return valve 16 or 17. Similarly the servo-control valve spindle may be centralized by admitting an impulse of pressure liquid to both ends of the valve spindle simultaneously, or by releasing pressure at both ends.

It will be understood that impulse pressure to actuate the above described servo-control valve may be supplied by the overflow from a relief valve, or it may be supplied by a connection off the servo-pressure supply line by means of, for instance, a push button-actuated or tappet-actuated admission valve. All that is required to admit sufficient impulse pressure liquid to move the spindle over until the portion 22 uncovers the servo-pressure chamber 13 and then the servo-pressure takes charge and moves the valve spindle over to complete the movement to right or to left as the case may be.

Fig. 4 shows the valve spindle after it has made complete movement to the right and it will be seen that the spindle is maintained in that position by servo-pressure passing from chamber 13 to chamber 12 along reduced portion 24 and thence via transverse passage 28 and longitudinal bore 26 and orifice 26a to spring chamber 33, servo-pressure acting on the full area of the left hand end of the spindle. In that position, Fig. 4, servo-pressure is also directed via chamber 12 and connection CL to one end of the servo-actuated primary control valve (not shown), the other end being free to exhaust via chamber 14 and connection CR; and it is so arranged that the pressure in the pipe line from CL to move the primary control valve is such as to overcome the force of spring 41 of the servo-control valve. The same is true with reference to spring 31 and pipeline to connection CR when the servo-control valve spindle is moved to the extreme left.

It will be appreciated that the longitudinal bores 26 and 27 and the transverse passages 28 and 29 in the valve spindle provide permanent communication between the spring chambers 33 and 43 and the respective annular chambers 12 and 14. An alternative construction in accordance with this invention is to replace the said bores and passages in the valve spindle by corresponding passages in the valve body to serve the same purpose, suitable chokes or orifices being provided to create back pressure in the same way as orifices 26a and 27a described in the previous embodiment.

What is claimed is:

1. The combination in a control valve having a member movable from a contral position in opposite directions to either of two operated positions in which it is effective to direct fluid from a pressure source to either of two fluid delivery passages alternatively, of spring means acting on opposite ends of said member to bias it toward said central position, means for directing an impulse of pressure fluid against either end of said member to shift it from said central position against the force exerted on the other end by said spring means, said member having bores opening respectively at opposite ends of the member and at points intermediate the ends of the member operative in the initial movement of the member from central position to direct pressure fluid from said source against the end of the member which received the pressure impulse whereby to effect movement of the member to fully operated position.

2. In a control valve, in combination, a casing defining a bore opening at opposite ends into closed chambers, each of said chambers having an exhaust passage normally closed by a spring biased check valve, a spindle slidably fitted in said bore and having its opposite ends projecting into the respective chambers, spring means acting on said spindle to bias it toward a central position in said bore, ports in said casing communicating with said bore including a pressure fluid inlet port, an exhaust port and a pair of fluid delivery ports, said spindle being operative in said central position to close said inlet port and to connect said chambers to said exhaust port and movable in opposite directions to either of two operated positions to connect the respective outlet ports to the inlet and exhaust ports alternatively, means for introducing pressure fluid into one of said chambers to move said spindle from its central position toward one operated position against the force exerted on its other end by said spring means, said spindle being operative in its initial movement from central position to interrupt the connection to the exhaust port and direct pressure fluid from said inlet port to said one chamber to complete the shifting of the spindle to fully operated position, said spindle being operative to maintain the connection of the other chamber with the exhaust port when in said one operated position, means for introducing pressure fluid into the other of said chambers to augment the force exerted on the spindle by said spring means and thereby shift the spindle from the fully operated position back through the central position and toward the other operated position.

References Cited in the file of this patent
UNITED STATES PATENTS

| | | |
|---|---|---|
| 785,918 | Rhodes | Mar. 28, 1905 |
| 1,301,025 | Woodeson | Apr. 15, 1919 |
| 1,921,023 | Chambers | Aug. 8, 1933 |
| 2,214,394 | Wood | Sept. 10, 1940 |
| 2,237,038 | Moore | Apr. 1, 1941 |
| 2,655,940 | Jackson | Oct. 20, 1953 |
| 2,732,860 | Ray | Jan. 31, 1956 |

UNITED STATES PATENT OFFICE
CERTIFICATE OF CORRECTION

Patent No. 2,882,931 April 21, 1959

Frank Hathorn Towler et al.

It is hereby certified that error appears in the printed specification of the above numbered patent requiring correction and that the said Letters Patent should read as corrected below.

Column 4, line 11, for "contral position" read -- central position --.

Signed and sealed this 18th day of August 1959.

(SEAL)
Attest:

KARL H. AXLINE
Attesting Officer

ROBERT C. WATSON
Commissioner of Patents